[19] United States Patent
Krantz

[15] 3,668,273
[45] June 6, 1972

[54] ORGANOPOLYSILOXANE-POLYPHENYLENE OXIDE BLOCK COPOLYMERS & METHOD OF PREPARATION

[72] Inventor: Karl W. Krantz, Schenectady, N.Y.
[73] Assignee: General Electric Company
[22] Filed: Mar. 5, 1971
[21] Appl. No.: 121,518

[52] U.S. Cl. ..........................260/824 R, 99/174, 117/232, 260/18 S, 260/33.6 SB, 260/33.8 SB, 260/46.5 E, 260/448.2 N, 260/613 R, 264/184, 260/46.5 G, 260/47 ET
[51] Int. Cl. ................C08g 47/10, C08g 43/02, C08g 23/16
[58] Field of Search ...........................................260/824 R

[56] References Cited

UNITED STATES PATENTS

| | | | |
|---|---|---|---|
| 3,539,656 | 11/1970 | Noshay et al. | 260/824 |
| 3,539,655 | 11/1970 | Strachan et al. | 260/824 |
| 3,522,326 | 7/1970 | Bostick et al. | 260/824 |
| 3,063,872 | 11/1962 | Boldebuck | 260/824 |

Primary Examiner—Samuel H. Blech
Attorney—Donald J. Voss and Donavon L. Favre

[57] ABSTRACT

Novel block copolymers are provided having both polydiorganosiloxane segments and polyphenylene oxide segments. The block copolymers are selected from those having the formula:

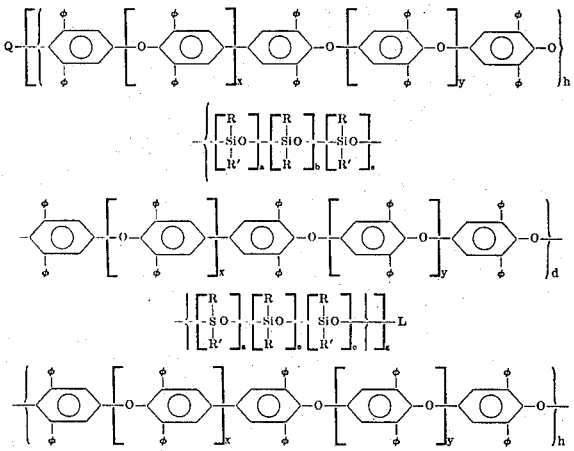

where Q and L are chosen from the group consisting of:
Option 1 - when Q is a single bond, L is a single bond forming a cyclic or infinite polymer;
Option 2 - when Q is HO, then L is:

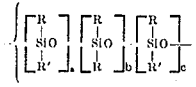
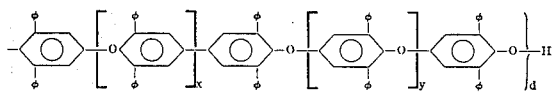

Option 3—when Q is

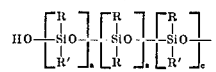

then L is H
Option 4—when Q is

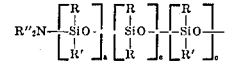

then L is

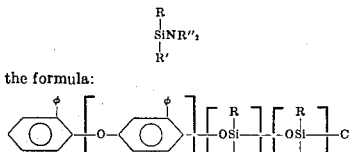

and those having the formula:

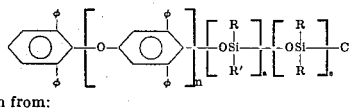

where C is chosen from:

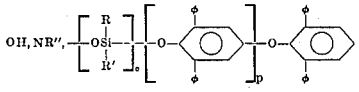

where R is one of a variety of organic substituents, R' is a nonphenyl substituent; each R'' is independently selected from the class consisting of hydrogen, lower alkyl radicals having from one to six carbon atoms, and aryl radicals; $\phi$ is the phenyl substituent; $a$, $b$, $c$, and $e$ are representative of the chain length of the polydiorganosiloxane components; $n$, $p$, $x$, and $y$ are representative of the length of of polyphenylene oxide components; and $d$, $f$, $g$ and $h$ are indicative of the number of recurring units in the block copolymer, and each $a$, $b$, $c$, $e$, $n$, $p$, $x$, $y$, $d$, $f$, $g$ and $h$ are independent of each other, for example, the value of $a$ in a polysiloxane block of a particular polymer can be different from the value of a second $a$ in the same polymer.

The block copolymers are formed by reacting polyphenylene oxide segments with polydiorganosiloxane segments which are chain terminated with amine groups. Additional length can be obtained through further reaction of the remaining amine groups.

The materials produced according to this invention are useful in the formation of oriented films and fibers and as plasticizers for polyphenylene oxide. The films can be wrapped or extruded onto wires to provide electrical insulation. The films are also heat shrinkable and can be used to package turkeys using a heat shrinkable bag made from the film.

15 Claims, No Drawings

ORGANOPOLYSILOXANE-POLYPHENYLENE OXIDE BLOCK COPOLYMERS & METHOD OF PREPARATION

BACKGROUND OF THE INVENTION

The value of both polyphenylene oxide polymers and organosiloxane polymers, individually, has long been known in the art. Each of these materials has particular and unique properties. Previous attempts to form block copolymers incorporating both types of materials, so as to take advantage of the inherent strengths of each of the materials have heretofore proven generally unsuccessful. Thus, block copolymers of the two materials have been unavailable.

The marriage of these two types of materials into a single copolymer has, of course, been desired. A major stumbling block to the availability of such block copolymers has been the inability to adequately form them. For example, and in particular, copolymers of alternating or $(A'B')_z$ type, and also of the $B'A'B'$ type, where $A'$ is a polyphenylene oxide segment and $B'$ is an organosiloxane segment have been unavailable because of the unavailability of a suitable polyphenylene oxide segment which could be reacted at both ends of the chain. Such a problem is dealt with and solved in my copending U.S. application, Ser. No. 121,517 filed of even date herewith and assigned to the same assignee as the present invention. In that application, I have described and claimed the difunctionally terminated polyphenylene oxide chains and the method for forming such chains. These intermediates have proven invaluable in the formation of block copolymers of the $B'A'B' <$ and $(A'B')_z$ type.

Another major stumbling block to the formation of block copolymers as described herein has been the absence of a process for adequately coupling the materials. Frequently used organopolysiloxane intermediates, such as those having halogen terminals, have proven ineffectual, particularly in the formation of strong polymers suitable for use in fibers and films.

SUMMARY OF THE INVENTION

In accordance with the present invention, I have unexpectedly discovered that organosiloxane segments may be joined to polyphenylene oxide. The compositions have the formulas:

(I)

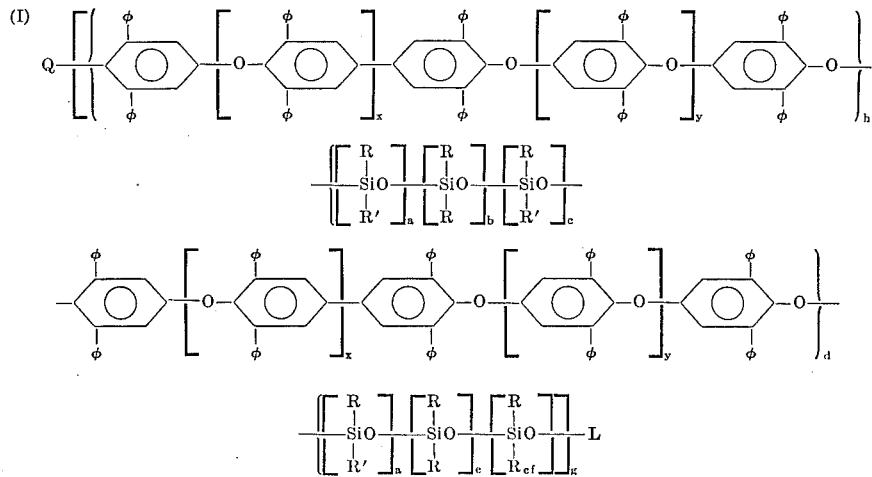

and
(II)

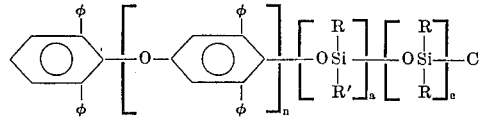

where Q is chosen from the group consisting of a single bond, OH,

and

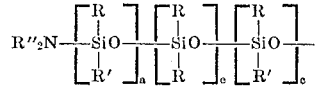

is chosen from the group consisting of a single bond,

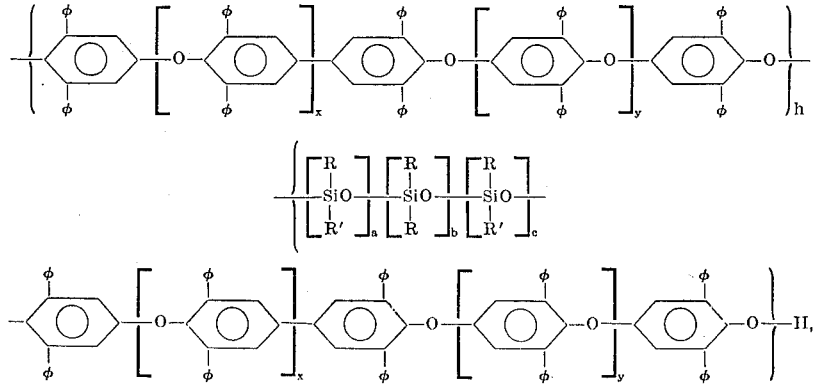

H, $\underset{\underset{R}{|}}{\overset{\overset{R}{|}}{Si}}NR''_2$, and C is chosen from the group consisting of

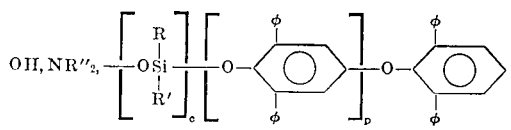

wherein each R' is independently selected from the class consisting of lower alkyl radicals having from one to six carbon atoms and cyano lower alkyl radicals and when R' is part of a siloxy unit which is not directly adjacent to a phenylene oxide unit it can also be a mononuclear or binuclear aryl radical, R is selected from the class as R', and in addition mononuclear and binuclear aryl radicals and in addition one of the radicals R and R' in each organic siloxy unit may by hydrogen, R'' is independently selected from the class consisting of hydrogen, lower alkyl radicals having from one to six carbon atoms and mononuclear and bi-nuclear aryl radicals; $\phi$ is phenyl; each $a$ is from one to 10, each $b$ is from zero to 16, each $c$ is from zero to 10, when $b$ is zero and from 1 to 10 when $b$ is greater than zero; $a+b+c$ is from 1 to 200 provided further that the value of subscript $a$ or $c$ for the siloxane block directly linked to

and for that block only is diminished by one from its value as a unit in a corresponding non-silyl amino-terminated polysiloxane, $d$ is 0 or more; $e$ is from 0 to 1,000, $a+c+e$ is from one to 1,000; $f$ is 0 or more; $g$ is one or more; $h$ is 0 or more; $n$ is at least 30; $p$ is at least 30; $x$ is from 0 to 20; and $y$ is from 0 to 20; with a further provision that when Q and L are single bonds, they are one and the same single bond which joins the ends of the molecule depicted by formula I to form a cyclic molecule;

when Q is HO, then L is

and the value of the subscript ($a$ or $c$) for the L-linked terminal siloxane block only is diminished by one from its value as a unit in the corresponding non-silyl amino-terminated polysiloxane;

these segments are joined through the use of a diamino-terminated organosiloxane of formula:

(III) 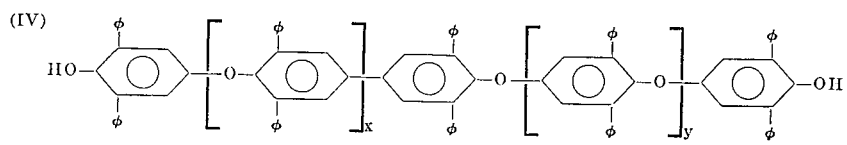

The type of polyphenylene oxide employed depends upon the type of block copolymer to be formed. This invention relates, in one aspect, to block copolymers of the B'A'B' and (A'B') type where A' is a polyphenylene oxide segment and B' is an organosiloxane segment, where the copolymer has the structure of formula I. It will be noted that when $h$ is zero that Q is attached directly to the polysiloxane chain. In any event, there must be at least one polyphenylene oxide segment in the copolymer.

In forming the block copolymers of formula I, difunctionally substituted polyphenylene oxide segments are employed, these segments being formed as described in my aforementioned copending U.S. application Ser. No. 121,517. As explained in that application, these segments have the formula:

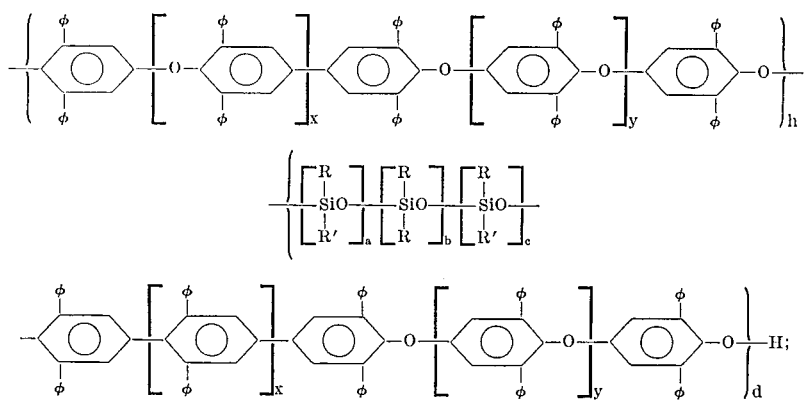

when Q is

then L is H; and when Q is

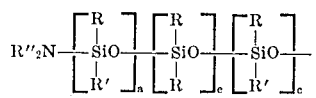

then L is

where $x$, $y$ and $\phi$ are as previously defined. Preferably, $x$ and $y$ are independently from 1 to 10. Also, by reference to the same copending application, it will be appreciated that in a major fraction of the molecules present the value of $x$ is believed to be zero; however, because of certain cleavages and rearrangements during their formation, a minor fraction of the polyphenylene oxide segments may have values of $x$ greater than zero. Thus, in the examples of the first embodiment below, the segments are indicated by the simplified formula:

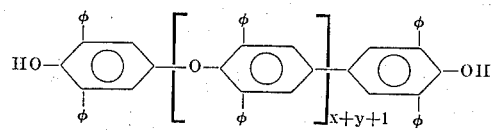

where $x$ and $y$ are as previously defined; and in these examples where a value is given for $y$, it is probable that in some percentage of the segments, the value is for $x + y$.

In a second embodiment, this application relates to block copolymers of formula A'B'A', where A' and B' are as previously defined, having the structure of formula II, where R, R', $a$, $c$, and $\phi$ are as previously defined; $e$ is from 0 to 1,000, with the relationship of $c$ to $b$ being the same as the relationship of $c$ to $e$; $a + c + e$ is from 1 to 1,000; $n$ is greater than 30; and $p$ is greater than 30. Preferably, $a + c + e$ is from 1 to 100, and $n$ is from 30 to 1,000.

The copolymers of formula II are prepared by reacting the amino-terminated organosiloxane of formula III with a polyphenylene oxide of formula:

(V)

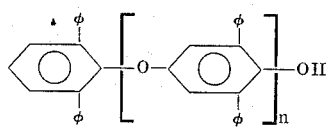

where $n$ and $\phi$ are as previously defined.

The block copolymers of formula I and II, as has been described, can be formed by reaction of the diamino-terminated organosiloxane of formula III with either the polyphenylene oxide of formula IV or the polyphenylene oxide of formula V, depending upon the block copolymer sought. In either case, additional diorganosiloxane units can be incorporated into the block copolymer through further reaction with non-amino-terminated polydiorganosiloxanes. However, it may be advantageous in some cases to employ a diamino-terminated polydiorganosiloxane of formula:

(VI)

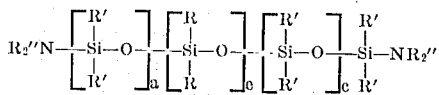

where R, R', $a$, $c$ and $e$ are as previously defined.

Formation of either of the block copolymers of formulas I and II first requires production of the amino-terminated polydiorganosiloxane of formulas III or VI. This is best accomplished by reaction of a polydiorganosiloxanediol with the appropriate reactant to form the desired amino group, in a refluxing solvent. The solvent should be chosen, not for the polydiorganosiloxane which is relatively easily soluble, but rather for the polyphenylene oxide segment which is to be added. The polyphenylene oxide segment is difficultly soluble and a heterogeneous reaction mixture will result in undesirable side reactions. If desired, reaction can be carried out by addition of the diamino-terminated organosiloxane material to the polyphenylene oxide. Following this reaction, "back coupling" reactions are possible with other polydiorganosiloxane materials, for example, polydiorganosiloxanediols, which are reactive with the amine terminals which remain. On the other hand, when hydroxy radicals remain, amine-terminated polysiloxanes of formulas III and VI can be used. In addition, the block copolymers described above can be reacted with each other provided that one copolymer has amino terminal groups and the other has hydroxyl terminal groups, e.g., silanol groups or phenolic OH groups. Thus, the length of the organo-siloxane segment can be extended or an organosiloxane segment having substituents different from those present in the amino-terminated siloxane segment originally employed can be introduced. The product may be recovered by adding the reaction mixture to a poor solvent for the product.

DESCRIPTION OF THE PREFERRED EMBODIMENTS

The present invention relates to two block copolymer embodiments where the blocks are of polyphenylene oxide and organosiloxane. These embodiments include those of the B'A'B' and (A'B')$_x$ type as illustrated in formula I and those of the A'B'A' type as illustrated in formula II. As previously noted, at least the initial formation of these block copolymers involves reaction of the amino-terminated organopolysiloxane of formula III or VI with either the polyphenylene oxide of formula IV, or that of formula V, in a refluxing solvent.

The amino-terminated organopolysiloxane preferably employed has the formula set forth previously as formula III, where R, R', R'', $a$, $b$ and $c$ are as defined. As indicated, R is selected from the class consisting of lower alkyl radicals having from one to six carbon atoms, aryl radicals, and cyanoalkyl radicals. The alkyl groups within this definition can be, for example, methyl, ethyl, propyl, butyl, amyl, and hexyl; the aryl groups can include phenyl, naphthyl, biphenyl, etc.; the cyanoalkyl groups include, for example, beta-cyanoethyl, beta-cyanopropyl, gamma-cyanopropyl, gamma-cyanobutyl, delta-cyanobutyl, etc. The alkyl and cyanoalkyl groups defined by R' can be the same as those included within R. The alkyl and aryl groups included within R'' can be the same as those defined for R, also. Preferably, R is methyl or phenyl, R' is methyl, and R'' is lower alkyl, most preferably methyl, ethyl, or propyl.

As will be noted, the diorganosiloxane group closest to the amine terminal is limited to a single aryl group, the other being chosen from alkyl and cyanoalkyl groups. This exclusion is occasioned, not by the amine group, but by the polyphenylene oxide group to which the organosiloxane segment will be joined during the reaction. There is apparently a steric hindrance between the two phenyl substituents on the polyphenylene oxide and two aryl groups which might be present upon the terminal diorgano-siloxane groups. For this reason, both $a$ and $c$ must be at least 1, when $b$ or $e$ in the same segment is greater than 0.

As indicated, it may in some cases be desirable to employ an amine-terminated organosiloxane of formula VI, where R, R', R'', $a$, $c$, and $e$ are as previously defined. In general, such a material would be employed as a preferred embodiment whenever the organosiloxane of formula VI is readily obtainable by the preliminary step of reacting an organosiloxane of formula III with an appropriate polydiorganosiloxanediol. In that case, substituent groups on silicon other than methyl, such as aryl and cyanoalkyl, may be present in either the siloxane of formula III or in the diol, or both as may be desired. In other cases, it may be advantageous to incorporate such groups by a "back-coupling" reaction.

The amount of polyphenylene oxide employed for a given copolymer is from 0.5 to 99.9 percent, the remainder being the organosiloxane segments. When the polymer desired is to be fluid or rubbery, the organosiloxane blocks should contain from 20 to several thousand diorganosiloxy units, while for a high modulus polymer, the organosiloxane blocks should contain from 1 to 20 diorganosiloxane units. Similarly, a rubbery polymer is formed with polyphenylene oxide blocks having from 2.5 to 20 diphenylphenoxy units, while high modulus block copolymers are obtained employing polyphenylene oxide segments having 20 or more diphenyl-phenoxy units. However, a predominant factor in determining copolymer physical properties is the gross per cent of diphenylphenoxy units. A measurement for the particular type of polymer is the intrinsic viscosity which, broadly speaking, is above 0.3 when measured in methylene chloride at 25° C. for fluid polymers, while rubbery and resinous polymers have intrinsic viscosities, measured under the same conditions, of 0.5 and up.

Inclusion of even small amounts of polyphenylene oxide blocks will change the polydiorganosiloxanes normal fluid properties. For example, inclusion of from ½ to 5 percent polyphenylene oxide segments provides a toughened room temperature vulcanizing type polymer which is nervy and has additional strength. From 5 to 30 percent polyphenylene oxide segments provides snappy elastomers which are thermoplastic, i.e., have no cross-linking. This is in contradistinction to previous polydiorganosiloxanes and is actually a counterpart of unvulcanized natural rubber. To some degree, the polyphenylene oxide blocks act as a pseudo-cross-linking.

When more than 30 percent polyphenylene oxide segments are included in the block copolymers, a high modulus is obtained, but the polymer is still tough. It may be cold drawn to form fibers of high tensile strength, such as from 40,000 to 50,000 lbs. per square inch. As such, it is essentially equal in tensile strength to cellulose acetate. It may also be extruded for various purposes and after orientation, it has excellent heat shrink properties.

As previously indicated, the reaction is generally carried out in a solvent and the solvent must be one which dissolves the more difficultly soluble polyphenylene oxide. The amount of solvent which is required is that which will provide a homogeneous reaction medium. Among the solvents which can be used are chlorobenzene, orthodichlorobenzene, and tetralin. Preferably, a polydiorganosiloxane diol is reacted to form the amine terminals and the polyphenylene oxide is then added to the refluxing solution in which the amino-terminated polydiorganosiloxane has been formed. The polydiorganosiloxanediol can be added to the polyphenylene oxide, followed by introduction of the amine generating material. As a third alternative, the diamino-terminated organosiloxane of formula III can be added to the poly-phenylene oxide oligomer in a combining ratio of N atoms to phenolic OH groups greater than one, after which the residual silylamine groups are reacted with a polydiorgano-siloxanediol. This order of reactions is especially useful in making copolymers containing groups of relatively closely spaced polyphenylene oxide segments, with larger siloxane chains linking such groups, that is, the copolymer of formula I wherein the sum of $d + h$ is greater than 1. Several such grouped or ganged copolymers are set forth in examples which follow, namely, Examples 5, 6, 7, 8, 9, 10, 32 and 34.

The amination of the polydiorganosiloxane generally requires from about 1 to about 3 hours. Reaction of the polyphenylene oxide with the amino-terminated polydiorganosiloxane generally requires from about 2 to 8 hours. Progress of both reactions can be monitored by the evolution of amine during reaction. When this evolution ceases, the reaction is completed.

The desired block copolymer is obtained from the reaction mixture by pouring the mixture into a poor solvent for the copolymer, such as methanol. Because of varying solubilities of the varying block copolymer lengths, the tendency is for the shorter block copolymers to remain in the solvent, so that only the longer, desired block copolymer is recovered. Further purification may be obtained by reprecipitation of the recovered product, or of the material remaining in the solvent.

As previously indicated, the length of the poly-diorganosiloxane block can be increased by a "back-coupling" reaction. This "back-coupling" reaction can be used either for a simple extension of length, employing a polydiorgano-siloxane which chemically is the same as the already joined group, or can be used to introduce a polydiorganosiloxane segment where at least some of the organic substituents on the chain are different from those originally introduced. Thus, the "back-coupling" method provides a convenient way of introducing diphenylsiloxy,methylphenylsiloxy, cyanoalkylmethylsiloxy, etc. units. These additional blocks are introduced by reacting the block precopolymer of polyphenylene oxide and polydiorganosiloxane segments with a polydiorganosiloxanediol. In this manner, the hydroxyl terminals of the newly introduced polydiorganosiloxane react with the remaining amine terminals on the preblock copolymer to link the new polydiorganosiloxane and create free amine. If additional polydiorganosiloxane is not to be introduced, but the length of the polydiorganosiloxane segment is to be increased by coupling the already present polydiorganosiloxane segments, then the "back-coupling" reaction can be carried out with water. In general, the "back-coupling" reactions are carried out with the same refluxing solvent as the original reaction. Some solvent, generally of the type employed for the original reaction, is incorporated into the "back-coupling" reagent as a thinner. Cyclic ethers, such as tetrahydrofuran, can also be used as a solvent.

The effect of the polyphenylene oxide, and particularly the two phenyl substituents on the phenoxy group is shown by the results of a base-catalyzed hydrolytic cleavage process. For example, when a block copolymer containing polydiorganosiloxane segments and diphenylphenoxy segments is heated in the presence of tetrahydrofuran, water, and 1,4-diazabis-2,2,2-bicyclooctane, and the rate of aroxysilane cleavage measured by a measurement of declining relative viscosity, and this measurement was compared with a similar destructive heating of a similar copolymer, but without the two phenyl substituents, it was found that the first block copolymer degraded only two-thirds as quickly as the second. Thus, the two phenyl substituents have a shrouding effect on the aroxy silane linkage.

The following examples are given to further illustrate the process and products of the present invention. These examples should be considered illustrative, only, of the reaction and products of the present invention and not as limiting in any way the full scope as covered in the appended claims. All parts, unless otherwise indicated, are by weight.

EXAMPLE 1

A quantity of 165 parts polyphenylene oxide oligomer having the average formula:

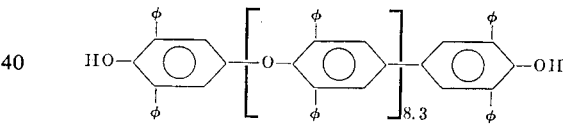

equivalent to formula IV where $y$ is 7.3 and $x$ is 0, was placed into 1,750 parts toluene along with 41.7 parts of an amino-terminated polydiorganosiloxane of formula:

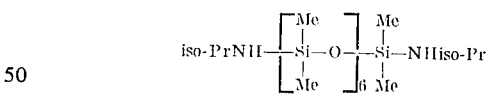

where iso-Pr is the isopropyl radical and Me is the methyl radical. This material is equivalent to the amino-terminated polydiorganosiloxane of formula III where one R" on each terminal is the isopropyl radical and one on each terminal is hydrogen, R and R' are methyl, and $a + b + c$ is 6. The polyphenylene oxide oligomer was prepared in accordance with my copending U.S. application Ser. No. 121,517.

The mixture was stirred and heated and during heating was purged with a stream of dry nitrogen. The toluene was allowed to distill to a pot temperature of 200° C. The temperature was held at 200°–202° C. for an additional 2 hours. The residue was cooled, dissolved in one volume of toluene and was then poured into 3 volumes of isopropanol with vigorous stirring. The precipitated copolymer was dried and then dissolved in methylene chloride. The resulting solution was pressure filtered and a film was cast onto a tin plate, followed by baking of the film at 140° C. to remove remaining solvent. Two inch dumbbells were cut from the resulting film and tested for tensile strength on an Instron tester at 2 inches per minute. The material showed a tensile strength of 1,740 psi with an elongation of less than 5 percent. Another dumbbell cut from the film was heated at 225° C. and was hot drawn to 4.5 times its original length. This drawn dumbbell was tested for tensile strength and showed 10,000 psi with a very high modulus.

EXAMPLE 2

A quantity of 98.6 parts of the isopropylamino-terminated polydiorganosiloxane material employed in Example 1 was placed into a reaction vessel, purged with dry nitrogen, along with 135 parts methylene chloride. The solution was stirred at room temperature and a quantity of 90 parts of a polyphenylene oxide oligomer in 675 parts methylene chloride was added over a period of 20 minutes. The polyphenylene oxide, prepared according to the disclosure of my copending U.S. application Ser. No. 121,517 had the average formula:

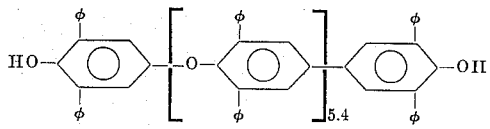

equivalent to the material of formula IV where $x$ is 0 and $y$ is 4.4. The material was stirred at room temperature for about 40 minutes, during which the evolution of isopropylamine was noted and the methylene chloride was then distilled off. A quantity of 1.44 parts water in 440 parts tetrahydrofuran was added to the original reaction mixture, with stirring, at room temperature. Additional amine was generated over the next 30 minutes. The temperature of the new reaction mixture was gradually raised and the tetrahydrofuran distilled from the mixture up to a temperature of 198°–204° C. over a period of 40 minutes. The resulting resinous polymer had an intrinsic viscosity of 0.21 dl./g. when measured in methylene chloride at 25° C. Infrared analysis was consistent with a resinous copolymer containing both dimethylsiloxane units and diphenylphenoxy units. The resinous copolymer contained 52.1 weight per cent polyphenylene oxide.

EXAMPLE 3

A quantity of 100 parts of the diaminopolydimethylsiloxane employed in Example 1 was placed in 3,500 parts toluene and was heated under dry nitrogen to a temperature of 120° C. A solution of 146 parts of a polyphenylene oxide oligomer having the average formula:

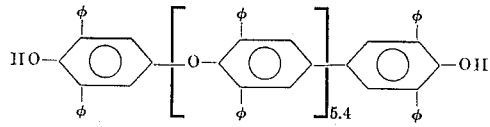

equivalent to the material of formula IV where $x$ is 0 and $y$ is 4.4, contained in 850 parts toluene was added over a period of 1 hour. Amine evolution was evident for 1 hour following completion of the addition. The bath temperature was held at 130° C. and 1,005 parts of a polydiorganosiloxanediol having the average formula:

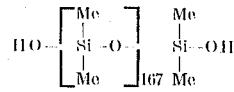

Where Me is the methyl group, contained in 600 parts toluene, was added over a 30-minute period. Additional isopropyl amine was generated while the reaction mixture was held at a temperature in the range of 130°–148° C. The bath temperature was raised to 202°–204° C. for a period of 35 minutes and the solvent was distilled from the mixture leaving a tough, rubbery copolymer mass. The intrinsic viscosity of the copolymer was 1.08 dl./g. measured in methylene chloride at 25° C., and it contained 11.8 weight per cent polyphenylene oxide segments. The block copolymer was dissolved in methylene chloride and was cast into an optically clear rubber sheet. The sheet, unfilled and uncured, showed a tensile strength of 550 psi and an elongation of 780 per cent on an Instron tester. The rubbery film was soluble in toluene.

EXAMPLE 4

A product was formed in a manner similar to that described in Example 3, but employing 111 parts of a polyphenylene oxide oligomer having the average formula:

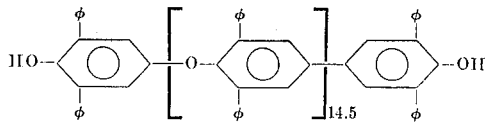

34 parts of the amino-terminated polydimethylsiloxane employed in Example 1, and 342 parts of the polydimethyl-siloxanediol employed in Example 3. The solvent employed was orthodichlorobenzene because of the lower toluene solubility of the polyphenylene oxide oligomer. Heating, following addition of the polydimethylsiloxanediol was continued at 199°–208° C. for 1 hours, but the solvent was not removed. The polymer, containing 23 weight per cent polyphenylene oxide blocks was precipitated into 4 volumes of isopropanol. The intrinsic viscosity of the resulting rubbery copolymer was 1.05 dl./g. when measured in methylene chloride at 25° C. A film of the rubbery copolymer was cast from methylene chloride, the translucent film showing a tensile strength of 1,080 psi, an elongation of 880 percent, permanent cold draw of 1.7 times original length, and high resilience.

EXAMPLE 5

A quantity of 150 parts of the isopropylamino-terminated polydimethylsiloxane employed in Example 1 was placed in 875 parts toluene in a vessel purged with nitrogen. The vessel and its contents were heated and over a 60-minute period a quantity of 292 parts of the polyphenylene oxide oligomer employed in Example 3, dissolved in 1,750 parts toluene was added at a temperature of 110°–127° C. while continuing the nitrogen purge. Heating was continued for an additional hour at 127°–129° C. whereupon amine evolution ceased. The result of this initial reaction was a precopolymer having the average structure:

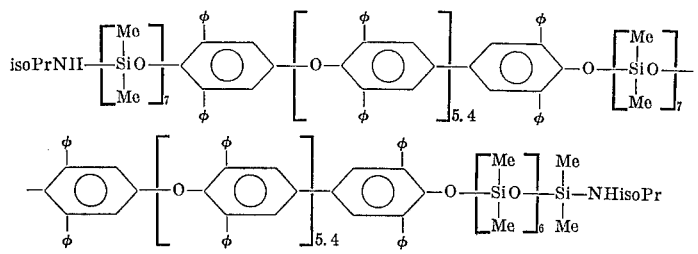

consistent with Formula I, wherein Q is

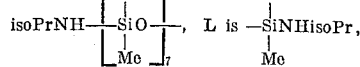, L is —SiNHisoPr,

R is methyl, R' is methyl, the value of $a$ preceding terminal

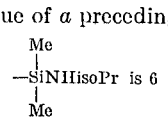 is 6 but elsewhere 7, $x$ is zero, $y$ is 4.4, $h$ is 1, $d$ is 1, $f$ is 1, and $g$ is 1. Thereafter, to the reaction system there was added a quantity of 1,005 parts of the polydimethylsiloxanediol employed in Example 3, dissolved in 875 parts toluene. Heating was continued at 130° C. for 4 hours and the temperature was then raised to distill the toluene from the reaction mixture. The reaction was concluded at 201°–207° C. for 70 minutes, and the crude copolymer was then cooled and dissolved in 5,250 parts toluene and precipitated into 14,000 parts isopropanol, with vigorous stirring. The main copolymer had an intrinsic viscosity, measured in methylene chloride at 25° C., of 1.17 dl./g. This polymer was cast from methylene chloride to form a highly resilient, elastomeric sheet which had a tensile strength of 1,370 psi and an elongation of over 1,300 percent. Before rupture the material was cold drawn to 1.7 times its original length. Most of the molecules present in this copolymer had the average structure.

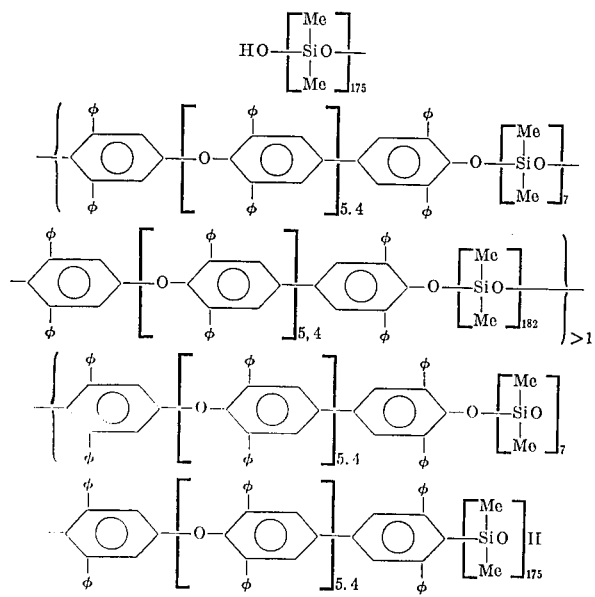

consistent with formula I, wherein $d$ is 1, Q is

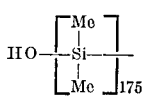

, L is hydrogen, R and R' are methyl, the sum of $a+b+c$ is 7, the value of $a+e+c$ in terminal polysilanol blocks is 175, but elsewhere 182, $x$ is zero, $y$ is 4.4, $h$ is 1, $f$ is 1, and $g$ is greater than 1. A relatively small proportion of this copolymer consisted of cyclic molecules having the average structure:

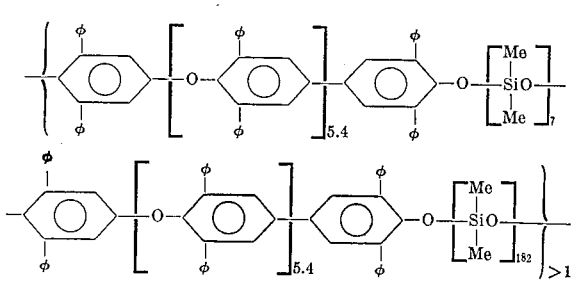

consistent with formula I, wherein Q and L are single bonds mutually linked, the sum of $a+e+c$ is 182, and R, R', $d$, $a$, $b$, $c$, $x$, $y$, $h$, $f$ and $g$ are the same as in the main product.

EXAMPLE 6

The material produced according to this example was similar to the material produced in Example 5, except that, in place of the polydimethylsiloxanediol employed in Example 3, the following polydimethylsiloxanediol, where Me is methyl, was employed:

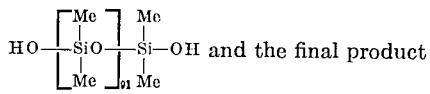

had aminosiloxane terminals. Most of the product molecules had the average formula:

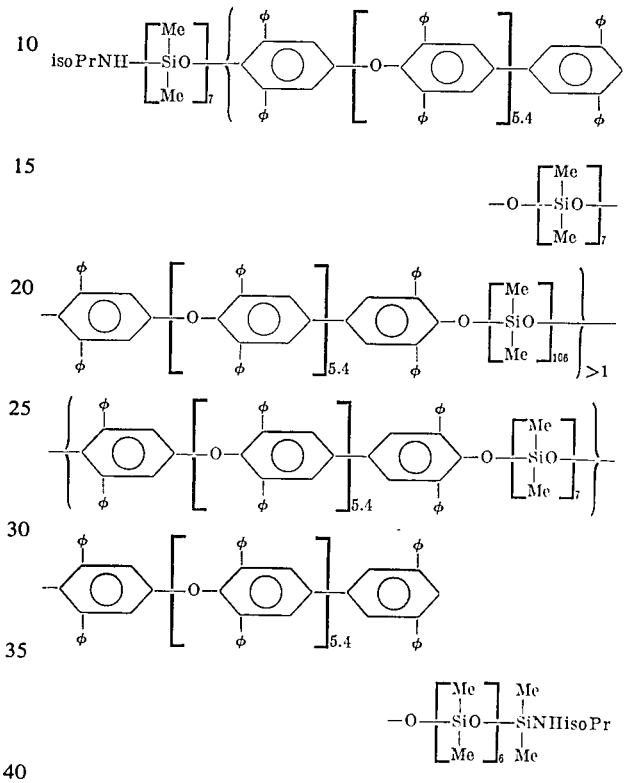

consistent with Formula I, wherein $d$ is 1, Q is

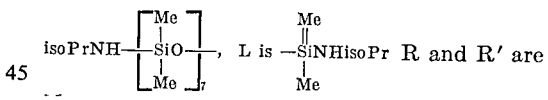

methyl, the sum of $a+b+c$ is 7, the value of $a+e+c$ in terminal aminopolysiloxane blocks is 6, but elsewhere 106, $x$ is zero, $y$ is 4.4, $h$ is 1, $f$ is 1 and $g$ is greater than 1. A relatively small proportion of this copolymer consisted of cyclic molecules having the average structure:

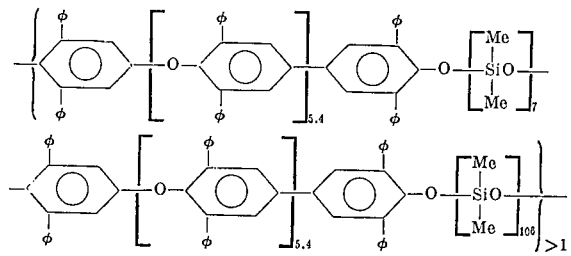

consistent with formula I wherein Q and L are single bonds mutually linked, the sum of $a+e+c$ is 106 and R, R', $d$, $a$, $b$, $c$, $x$, $y$, $h$, $f$ and $g$ are the same as in the main product. This block copolymer had an intrinsic viscosity, measured in methylene chloride at 25° C. of 0.85 dl./g. Cast from a methylene chloride solution, it yielded a clear, flexible, tack-free resin having a tensile strength of 2,060 psi and an elongation of 1,050 percent. It could be cold drawn to 3.6 times its original length with clear neck formation. In the drawn form, the material was a clear elastomer with good resilience and was heat-shrinkable at 150° C. and above to essentially the original undrawn dimensions. The uniaxially oriented block copolymer showed a tensile of 6,950 psi and an elongation of 210 percent, with no fibrillation at break.

EXAMPLE 7

In this example the same materials as were employed in Example 6 were again employed. However, the ratio of isopropylamine groups, as obtained from the diaminopolydimethylorganosiloxane used in Example 1, to phenolic OH groups, as obtained from the polyphenylene oxide oligomer of Example 3 was reduced from 3:2 to 5:4. The resulting copolymer had the average formula:

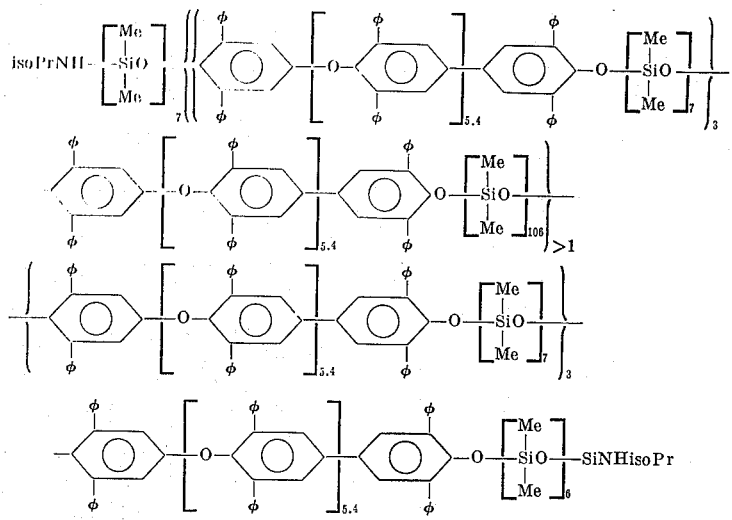

along with a very small proportion of the cyclic copolymer of average formula:

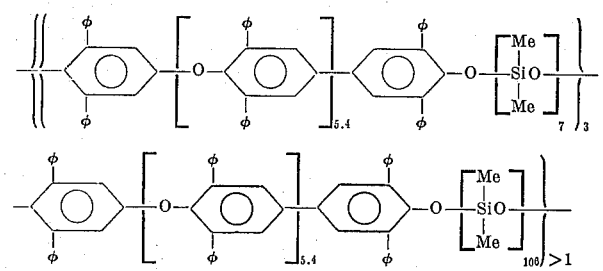

Each of these products is consistent with formula I wherein $d$ is 3 and R, R', $a, b, c, e, f, g, h, x$ and $y$ are as defined in Example 6 for the main product and cyclic product respectively.

This block copolymer, having 43.5 weight per cent polyphenylene oxide segments, showed an intrinsic viscosity of 0.85 dl./g. when measured in methylene chloride at 25° C. Dumbbells were cut from the optically clear cast sheet which resulted from this block copolymer and the dumbbells showed a tensile strength of 2,820 psi, an elongation of 620 percent based upon the original dimensions, and a tensile strength of 13,600 psi, based upon the broken dimensions. The cold draw ratio of this block copolymer was 4.5 times original length and the uniaxially oriented block copolymer was a clear, tough, flexible resin having a tensile strength of 14,400 psi with 50 percent elongation and no fibrillation.

EXAMPLE 8

Employing the same methods and ratios as in Example 7, but using a polyphenylene oxide oligomer of average formula:

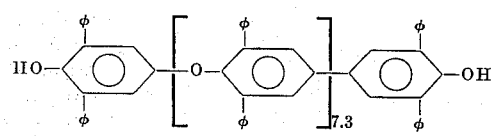

the following block copolymer was formed, where Me is the methyl group and $\phi$ is the phenyl group:

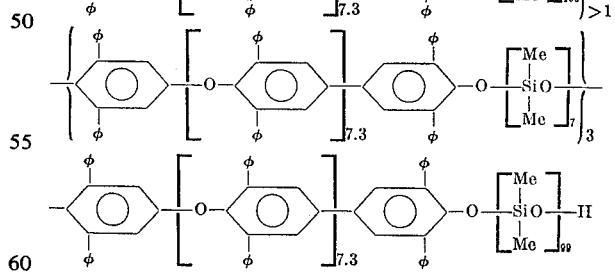

along with a very small proportion of the cyclic copolymer of average formula:

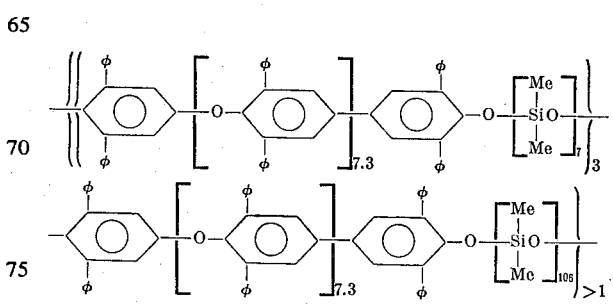

This block copolymer, having a 49 weight per cent polyphenylene oxide segment, showed an intrinsic viscosity in methylene chloride at 25° C. of 1.10 dl./g. Its tensile strength was 3,250 psi, with an elongation of 550 percent on cut dimensions. On broken dimensions, the tensile strength was 13,200 psi. The block copolymer could be cold drawn to a ratio of 4.5 times original length and the drawn strips broke at 15,000 psi with a 40 percent elongation and without fibrillation. The copolymer was optically clear both before and after drawing.

A dumbbell of the film formed from this block copolymer was subjected to saturated steam at a pressure of 200 psi for 6 hours at 195° C. While the specimen thus treated was somewhat porous, its dimensions were unchanged. The tensile strength was 1,100 psi at low elongation, but the material could not be cold drawn. Pressing the steam-treated material between flat plates resulted in a material which was transparent and could be cold drawn to twice its original length. The drawn strip had a tensile strength of 2,500 psi with a 30 percent elongation. This recovered material had an intrinsic viscosity of 0.30 dl./g. when measured in methylene chloride at 25° C.

Fibers could be formed from this block copolymer by spinning from a toluene solution into a methanol coagulating bath. The fibers were devolatilized at 140° C. and the monofilaments could be cold drawn to 4.5 times their original length, giving smooth, resilient, elastic fibers of 77 denier, with a tenacity of 0.79 g./denier. The fully drawn fiber, when annealed for 5 minutes at 175° C., could be further cold drawn to 1.7 times the drawn length, resulting in a fiber of 34 denier with a tenacity of 1.2 g./denier and a 60 percent elongation at break. All the fibers remain soluble in toluene. Other strips of the cold drawn material, with the annealing steps, could be drawn in three stages to 14 times original length. Most of the elongation was recoverable by heating at 200° C.

EXAMPLE 9

A block copolymer similar to that formed in Example 5, but employing diisopropylaminodimethylsilane as the coupling agent yielded a block copolymer having an intrinsic viscosity of 0.80 dl./g. which was a clear, resilient rubber with a tensile strength of 850 psi, an elongation of 880 percent, and a cold draw of 1.7 times original length.

EXAMPLE 10

A block copolymer was formed employing the coupling agent of Example 9 but with other materials and proportions equivalent to those of Example 8. This material had an intrinsic viscosity, measured in methylene chloride at 25° C., of 0.72 dl./g. A sheet cast from this block copolymer was optically clear and could be cold drawn to 3.3 times its original length. The tensile strength of the material was 2,950 psi with a 360 percent elongation, and a tensile of 10,800 psi on broken dimensions. The material could be hot drawn at 200° C. to a value between 6 and 8.5 times its original length and with a tensile strength, at break, of 12,800 psi.

EXAMPLES 11–19

In this series of examples, quantities of polyphenylene oxide having the formula:

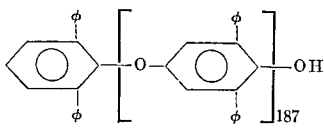

were employed in conjunction with the amino-terminated polydimethylsiloxane employed in Example 1. The original polyphenylene oxide had an intrinsic viscosity in methylene chloride at 25° C. of 0.55 dl./g. and in chlorobenzene at 25° C. of 0.45 dl./g. In each of the examples, 500 parts of the polyphenylene oxide were dissolved in 5500 parts chlorobenzene, followed by refluxing under dry nitrogen. The indicated quantity of the diisopropylaminopolydimethylsiloxane was then added and reflux continued until no isopropylamine was detectable in the effluent gas. This required from 3 to 4 hours. The amounts of diisopropylaminopolydimethylsiloxane, based upon the polyphenylene oxide, and the intrinsic viscosities of the final product are as indicated below:

| Example Number | Parts Organopolysiloxane Per Part Polyphenylene Oxide | Intrinsic Viscosity (dl./g.) | |
|---|---|---|---|
| | | Chlorobenzene | Methylene Chloride |
| 11 | 0.00288 | 0.67 | — |
| 12 | 0.00480 | 1.02 | — |
| 13 | 0.00576 | 1.12 | — |
| 14 | 0.00633 | 1.12 | — |
| 15 | 0.00670 | 1.15 | 1.02 |
| 16 | 0.00766 | 0.97 | — |
| 17 | 0.00920 | 0.85 | — |
| 18 | 0.0102 | 0.77 | — |
| 19 | 0.0111 | 0.77 | — |

The maximum viscosity of Example 15 indicated that the material had the calculated average formula:

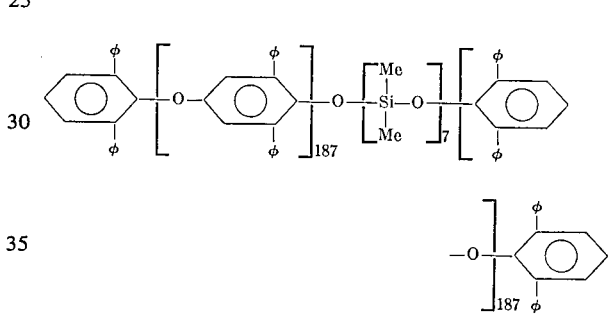

where Me is the methyl group and $\phi$ is the phenyl group. The product of Example 15, with 99.5 weight per cent polyphenylene oxide, was compatible with standard polyphenylene oxide. The tensile strength, after drawing to 5 times initial length at 225° C., was 36,000 psi.

EXAMPLES 20–22

In this series of examples the same procedure was followed as in Examples 11–19, except that the polyphenylene oxide, prior to reaction, had an intrinsic viscosity, measured in methylene chloride at 25° C., of 0.89 dl./g. The results obtained are as follows:

| Example Number | Parts Organopolysiloxane Per part Polyphenylene Oxide | Intrinsic Viscosity in Methylene Chloride (dl./g. |
|---|---|---|
| 20 | 0.0043 | 1.18 |
| 21 | 0.0034 | 1.30 |
| 22 | 0.0026 | 1.47 |

The tensile strength of the material of Example 22 was 28,000 psi with an elongation of 20 per cent after drawing to 5 times initial length at 225° C.

EXAMPLE 23

In this example the polyphenylene oxide segments employed in Examples 20 through 22 were coupled with the organosiloxane linking unit employed in Example 9. A quantity of 500 parts of the polyphenylene oxide was reacted with 0.42 part of the siloxane in refluxing chlorobenzene for a period of about 5 hours. The block copolymer was precipitated into hexane and was found to have an intrinsic viscosity of 1.30 dl./g. when measured in methylene chloride at 25° C.

EXAMPLES 24–28

In these examples the organosiloxane coupling agent used in Example 23 was used to couple polyphenylene oxide having an intrinsic viscosity, measured in methylene chloride at 25° C., of 1.15 dl./g. The results of these reactions are as follows:

| Example Number | Parts Organopolysiloxane Per Part Polyphenylene Oxide | Intrinsic Viscosity in Methylene Chloride (dl./g.) |
|---|---|---|
| 24 | 0.0005 | 1.47 |
| 25 | 0.0008 | 1.63 |
| 26 | 0.0011 | 1.67 |
| 27 | 0.0014 | 1.65 |
| 28 | 0.0020 | 1.37 |

EXAMPLE 29

A copolymer was prepared in the same manner as in Example 23, but employing 1.8 parts of the organo-siloxane coupling agent. Following this reaction, 31 parts of the polydimethylsiloxanediol employed in Example 3 was added and reflux was continued for 2 hours under dry nitrogen, while gradually raising the temperature to 205° C., and ultimately distilling the chlorobenzene solvent. The solid copolymer which remained was dissolved in methylene chloride and precipitated into 3 volumes of hexane. The reprecipitated block copolymer had an intrinsic viscosity of 1.40 dl./g. in methylene chloride at 25° C. and when cast from methylene chloride gave a hard, slightly hazy sheet with a slippery feel. A portion of the sheet was oriented at 225° C. and this material showed a tensile strength of 28,100 psi and an elongation of 16.4 percent.

EXAMPLE 30

In this example, the same procedure was followed as in Example 29. The polyphenylene oxide employed, however, was that employed in Examples 11 through 19, and the organosiloxane coupling agent was that employed in Example 1. The intrinsic viscosity of this material was 1.43 dl./g. when measured in methylene chloride at 25° C. It could be drawn to 6 times its original length at 225° C. and. in oriented form, showed a tensile strength of 39,000 psi with 16 percent elongation at break.

EXAMPLE 31

A polyphenylene oxide-organosiloxane block copolymer containing diphenylsiloxy units was prepared employing the process and materials of Example 10, except that the solvent employed was a mixture of orthodichloro-benzene and benzene, the ratio of N atoms in the coupling agent to phenolic OH groups was 2:1 and, in place of the polydimethylsiloxanediol, 1,1,3,3-tetraphenyldisiloxane-1,3-diol was employed. A quantity of 456 parts of the polyphenylene oxide oligomer was dissolved in a mixture of 5,200 parts orthodichlorobenzene and 2,600 parts benzene and the system was dried azeotropically by distilling 800 parts of the benzene. A quantity of 70 parts of diisopropylaminodimethylsilane was added and the system was heated for 2.5 hours at 124°–132° C. until isopropylamine evolution ceased. The preblock copolymer was then back coupled with 83 parts 1,1,3,3-tetraphenyldisiloxane-1,3-diol, initially at room temperature, and then at the reflux temperature of the solvent. The reaction mixture was poured into about 5 volumes of isopropanol to precipitate the polymer having the average structure:

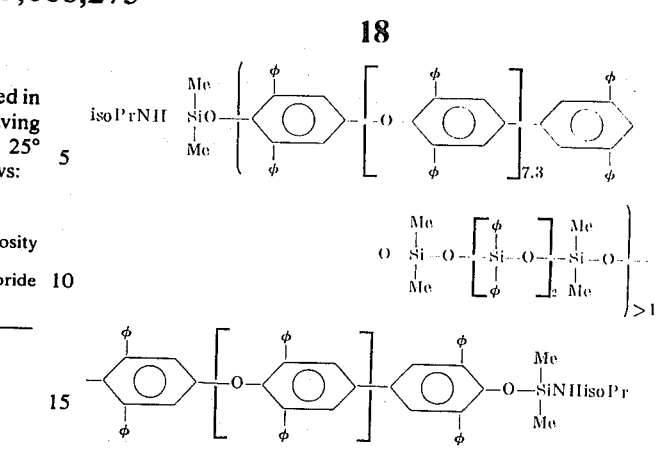

where Me is the methyl group and $\phi$ is the phenyl group. The infrared scan of the material was consistent with the structure. The material had an intrinsic viscosity, in methylene chloride at 25° C. of 0.27. It was a clear brittle resin and when mixed with standard polyphenylene oxide, e.g., the starting material of Examples 11–19, in methylene chloride gave an optically clear cast film.

EXAMPLE 32

In the same manner as in Example 31, a quantity of 4.92 parts difunctionally terminated polyphenylene oxide of average formula:

$$HO-\underset{\phi}{\overset{\phi}{\bigcirc}}-\left[O-\underset{\phi}{\overset{\phi}{\bigcirc}}\right]_{7.3}-\underset{\phi}{\overset{\phi}{\bigcirc}}-OH$$

and 1.07 parts of:

$$\text{iso-PrNH}-\left[\underset{Me}{\overset{Me}{Si}}-O\right]_3-\underset{M}{\overset{Me}{Si}}-\text{NHiso-Pr}$$

were placed in a mixture of 52 parts orthodichlorobenzene and 8.8 parts benzene and heated at 124°–151° C. for 5.7 hours. A silanol-terminated fluid containing 11.3 mol per cent diphenylsiloxane units, with the remainder being dimethylsiloxane units, was then added and heating was continued for an additional 2 hours at 151°–172° C., and then for 3 hours at 190°–200° C. The reaction mixture was poured into isopropanol to yield the product having the average formula:

$$HO-\left[\underset{O}{\overset{O}{SiO}}\right]_{6.2}-\left[\underset{Me}{\overset{Me}{SiO}}\right]_{52.8}-\left(\left\{\underset{\phi}{\overset{\phi}{\bigcirc}}\right\}-O\right.$$

$$-\underset{\phi}{\overset{\phi}{\bigcirc}}-\left[O-\underset{\phi}{\overset{\phi}{\bigcirc}}\right]_{7.3}-\underset{\phi}{\overset{\phi}{\bigcirc}}-O-\left[\underset{Mo}{\overset{Me}{SiO}}\right]_4\bigg\}_3$$

$$-\underset{\phi}{\overset{\phi}{\bigcirc}}-\left[O-\underset{\phi}{\overset{\phi}{\bigcirc}}\right]_{7.3}-\underset{\phi}{\overset{\phi}{\bigcirc}}-$$

$$-O-\left[\underset{Me}{\overset{Me}{SiO}}\right]_{52.8}-\left[\underset{\phi}{\overset{\phi}{SiO}}\right]_{6.2}-\left[\underset{Me}{\overset{Me}{SiO}}\right]_4\bigg\}_{>1}$$

$$\left\{\underset{\phi}{\overset{\phi}{\bigcirc}}-\left[O-\underset{\phi}{\overset{\phi}{\bigcirc}}\right]_{7.3}-\underset{\phi}{\overset{\phi}{\bigcirc}}-O-\left[\underset{Me}{\overset{Me}{SiO}}\right]_4\right\}_3$$

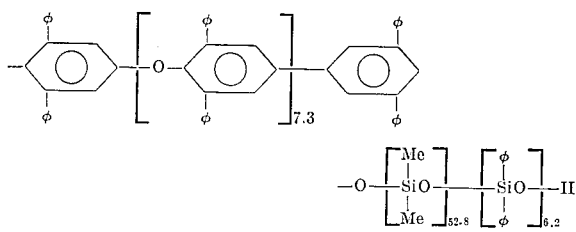

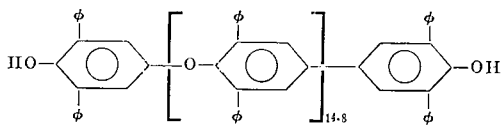

where Me is methyl and φ is phenyl. The resinous material had an intrinsic viscosity, measured in methylene chloride at 25° C., of 0.32 dl./g. It could be cast from methylene chloride as a clear flexible resin.

EXAMPLE 33

In this example, 5 parts of the polyphenylene oxide polymer employed in Examples 11 through 19 were dissolved in a mixture of 78 parts orthodichlorobenzene and 35 parts benzene and dried azeotropically. It was then reacted with 0.045 part of the isopropylamino-terminated dimethylpolysiloxane of Example 32 by heating at 140°–150° C. A quantity of 0.25 parts of the diphenylsiloxydimethylsiloxy material employed in Example 32 was then added and heating was continued at 200°–205° C. The resulting block copolymer was precipitated into 4 volumes of hexane and devolatilized at 140° C. to yield the product having the formula:

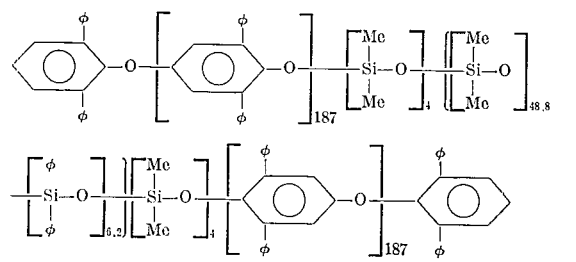

where Me is methyl and φ is phenyl. The material had an intrinsic viscosity, measured in methylene chloride at 25° C. of 1.10.

EXAMPLE 34

In this example, starting materials closely resembling those of Example 4 were used, but the order of reactions was reversed. Thus, the diaminopolydimethylsiloxane was first reacted with the polydimethylsiloxanediol to form a new diaminopolydimethylsiloxane of much greater average chain length, and the latter was then coupled in solution with the polyphenylene oxide oligomer. This is a preferred order of coupling reactions, having the advantage that since the two siloxane components are compatible without solvent, their reaction can be forced to completion relatively rapidly in bulk; thereafter solvent is added and the relatively more rapid reaction of silylamine groups and phenolic hydroxyl groups can be completed in solution at moderate temperatures. This obviates both the need for distillation and the problem of removing tough copolymer masses from the reaction vessel.

In this example, a mixture of 5.03 parts polydimethylsiloxanediol of the average formula:

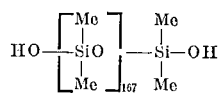

10.0 parts chlorobenzene and 0.46 part

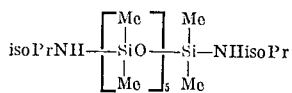

were heated in a stirred vessel under dry nitrogen at the reflux temperature of the solvent (oil bath temperature 146°–8° C.). After 65 minutes, evolution of isopropylamine ceased. A solution of 1.66 parts polyphenylene oxide oligomer having the average formula:

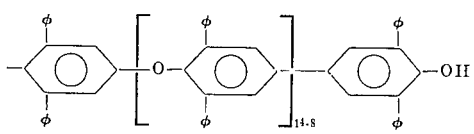

in 11 parts of methylene chloride and 80 parts of chlorobenzene was added and the methylene chloride was distilled off rapidly. Heating was continued as before and after 3.5 hours evolution of amine had ceased and the copolymer recovered by precipitating an aliquot in isopropanol had an intrinsic viscosity of 0.62 dl./g. measured in methylene chloride at 25° C. Thereafter, three successive increments, each 0.17 part of the same polyphenylene oxide oligomer, dissolved in two parts methylene chloride were added and after each addition methylene chloride was distilled off and reflux heating was continued until amine evolution ceased. After adding the third increment, no amine evolution was observed. The respective intrinsic viscosities measured as before were 1.06 dl./g. after the second incremental addition and 1.11 dl./g. after the final addition. This block copolymer was a tough resilient rubber when cast as a sheet from methylene chloride solution, having the average formula:

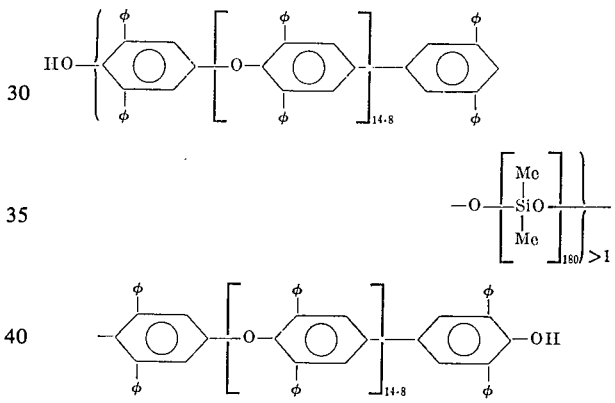

consistent with Formula I wherein Q is HO, L is

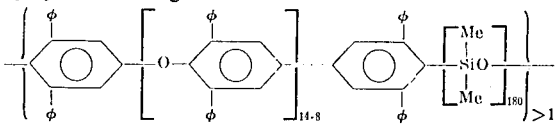

R and R' are methyl, the sum of $a + e + c$ is 180, $d$ is zero, $x$ is zero, $y$ is 13.8, $f$ is 1, $g$ is greater than 1 and $h$ is 1. Also present in this copolymer was a very small proportion of cyclic copolymer of average formula:

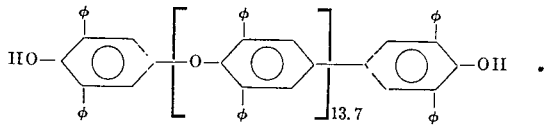

consistent with formula I wherein Q and L are single bonds mutually linked, and R, R', $a$, $e$, $c$, $d$, $x$, $y$, $f$, $g$ and $h$ are the same as for the main linear copolymer product.

EXAMPLE 35

This example illustrates the formation of a block copolymer having terminal silanol groups. This is a variation on the B'AB' structure containing on the average two A blocks closely spaced within the copolymer molecule. A solution of 2.07 parts of polyphenylene oxide oligomer having the average formula, in 13 parts of methylene chloride, 20 parts of chlorobenzene and 0.52 parts of the amino-terminated polydimethylsiloxane employed in Example 1 were heated in a stirred vessel under dry nitrogen. The methylene chloride was distilled off rapidly and thereafter the reaction mixture was held at reflux temperature of the chlorobenzene (oil bath 141°–150° C.) until amine evolution ceased (1.5 hours). Then 6.7 parts of the polydimethylsiloxanediol employed in Example 3, intrinsic viscosity 0.14 dl./g. measured in methylene chloride at 25° C., and 63 parts of chlorobenzene were added and heating was continued as above for 8 hours at which time no further amine evolution was detected. A sample of the product was stripped of solvent under vacuum and baked further at 140° C. until free of chlorobenzene. This block copolymer having the average formula,

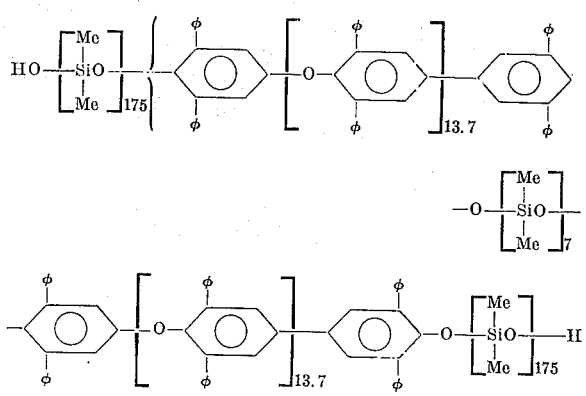

had an intrinsic viscosity of 0.25 dl./g. The main product solution was precipitated by pouring into 340 parts of isopropanol. The flocculent precipitate after centrifuging and drying at 115° C., 3.2 parts, was a nervy gum, intrinsic viscosity 0.35 dl./g. The soluble fraction recovered by evaporation of the centrifugate, 5.4 g., was a viscous, sticky fluid, intrinsic viscosity 0.20 dl./g. (all viscosities measured in methylene chloride at 25° C.).

These copolymers were useful in the formulation of improved room temperature vulcanizing elastomers. The presence of reactive silanol terminals in both fractions was demonstrated, for example, by the following tests. To 100 parts of each fraction dissolved in 500 parts of methylene chloride, there was added 5 parts of methyltriacetoxysilane and 0.25 part of stannous octoate. The solutions were poured into trays and allowed to evaporate in air. After 3 hours, both residues were tack-free, resilient rubbers. The product from the precipitate fraction had a considerably higher modulus. These rubbers were swollen but not dissolved by long immersion in methylene chloride.

Both of the above copolymer fractions were compatible with the original polydimethylsiloxanediol material, and could be co-cured therewith. For example, the above cure test was repeated, except that 50 parts of the polydimethylsiloxanediol was substituted for 50 parts of each copolymer fraction. Again, fully cured, tack-free, $CH_2Cl_2$ - insoluble rubbers were obtained in 3 hours, having elastic moduli lower than the respective products based on copolymer fractions above.

Thus, a variety of polyphenylene oxide-diorganopolysiloxane block copolymers have been shown. These include block copolymers of the B'A'B' and A'B'A' type, as well as of the (A'B') type or, in other words, recurring segments of diorganopolysiloxane and polyphenylene oxide in various, selected orders. In addition, a method for preparation of these block copolymers has been shown.

It will be appreciated that the reactive groups originally present in the organopolysiloxane segments set forth in the examples may be allowed to remain should this be desirable. Further, the reactive terminals may be reacted with chain-terminating organosilane materials, such as by reacting the block copolymers with trimethylsilane, trimethylchlorosilane, trimethylsilanol, methoxytrimethylsilane, etc. Further, chemically different chain-terminating groups may be employed. The type of chain terminal is not critical to the block copolymers described, however, for specific end uses particular terminals, such as the silanol groups of Example 35, may be desired.

While various compositions and reactions have been described in detail, the invention should not be considered as so limited, but as encompassing all those within the spirit and scope of the appended claims.

What I claim is:

1. A block copolymer formed of polydiorganosiloxane segments and polyphenylene oxide segments said block copolymer being selected from the group consisting of:

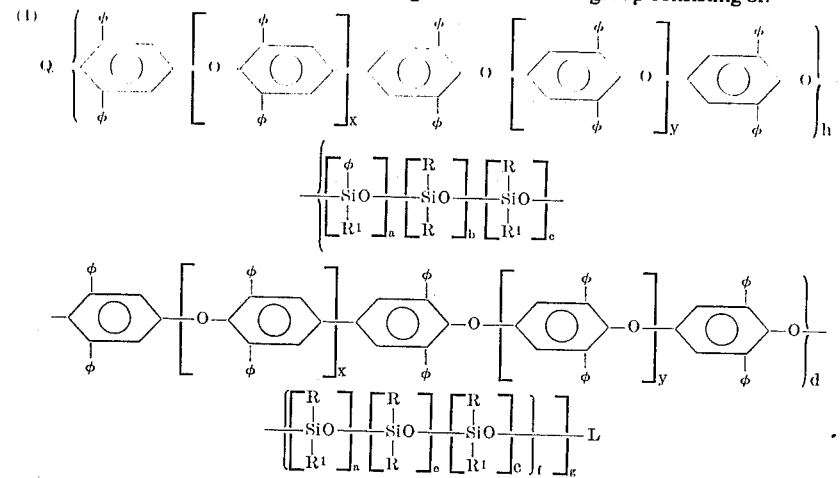

and

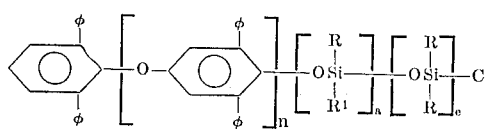

where Q is chosen from the group consisting of a single bond, OH,

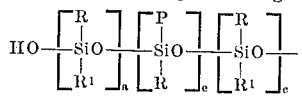

and

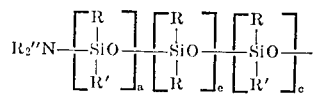

L is chosen from the group consisting of a single bond,

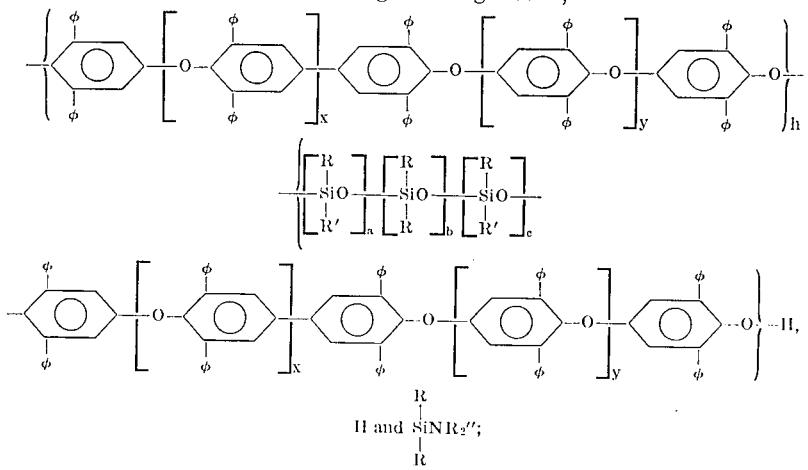

H and $\mathrm{SiNR''_2}$;

and C is chosen from the group consisting of

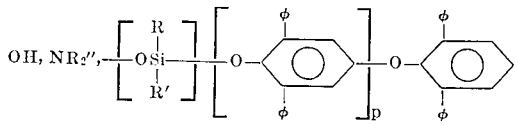

wherein each R' is independently selected from the class consisting of lower alkyl radicals having from one to six carbon atoms and cyano lower alkyl radicals and when R' is part of a siloxy unit which is not directly adjacent to a phenylene oxide unit it can also be a mononuclear or binuclear aryl radical, R is selected from the same class as R', and in addition mononuclear and binuclear aryl radicals and in addition one of the radicals R and R' in each organic siloxy unit may by hydrogen, R'' is independently selected from the class consisting of hydrogen, lower alkyl radicals having from one to six carbon atoms and mononuclear and binuclear aryl radicals; $\phi$ is phenyl; each $a$ is from one to 10, each $b$ is from 0 to 16; each $c$ is from 0 to 10 when $b$ is 0 and from 1 to 10 when $b$ is greater than 0; $a + b + c$ is from 1 to 200 provided further that the value of subscript $a$ or $c$ for the siloxane block directly linked to $$\mathrm{Si-NR''_2}\atop\mathrm{R'}$$

and for that block only is diminished by one from its value as a unit in a corresponding non-silyl amino-terminated polysiloxane, $d$ is 0 or more, $e$ is from 0 to 1,000, $a+c+e$ is from one to 1,000, $f$ is 0 or more, $g$ is 1 or more, $h$ is 0 or more, $n$ is at least 30, $p$ is at least 30, $x$ is from 0 to 20, and $y$ is from 0 to 20; with a further provision that when Q and L are single bonds, they are one and the same single bond which joins the ends of the molecule depicted by formula I to form a cyclic molecule; when Q is HO, then L is

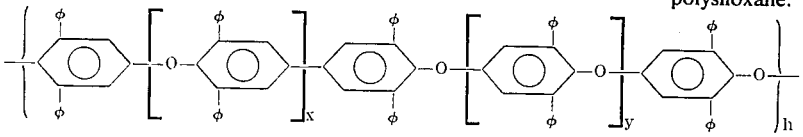

when Q is

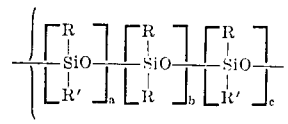

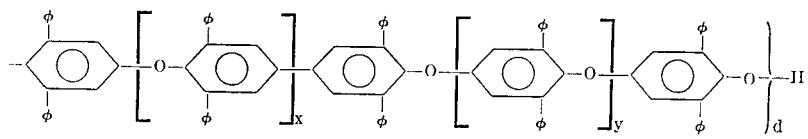

then L is H; and when Q is

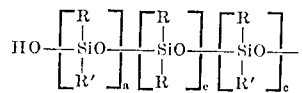

then L is

and the value of the subscript ($a$ or $c$) for the L-linked siloxane block only is diminished by one from its value as a unit in the corresponding non-silyl amino-terminated polysiloxane.

2. The block copolymer of claim 1 having the formula:

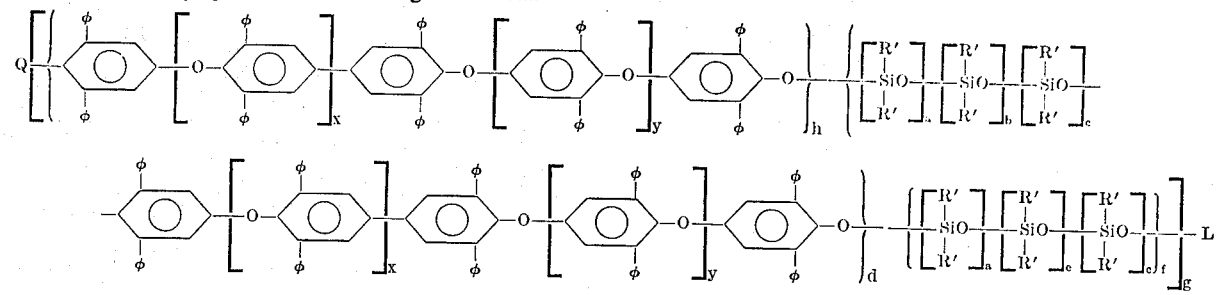

3. The block copolymer of claim 2 wherein R' is selected from the class consisting of methyl and phenyl.

4. The block copolymer of claim 3 wherein each R is methyl.

5. The block copolymer of claim 2 wherein $a+b+c$ is from 1 to 10.

6. The block copolymer of claim 1 having the formula:

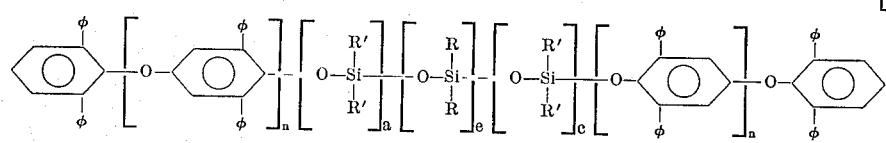

7. The block copolymer of claim 6 wherein R is selected from the class consisting of methyl and phenyl and R' is methyl.

8. The block copolymer of claim 7 wherein each R is methyl.

9. The block copolymer of claim 6 wherein each $n$ is from 30 to 1,000.

10. The block copolymer of claim 6 wherein $a + c + e$ is from 1 to 100.

11. A process for forming block copolymers having polydiorganosiloxane segments and polyphenylene oxide segments and having a formula selected from the class consisting of:

(I)
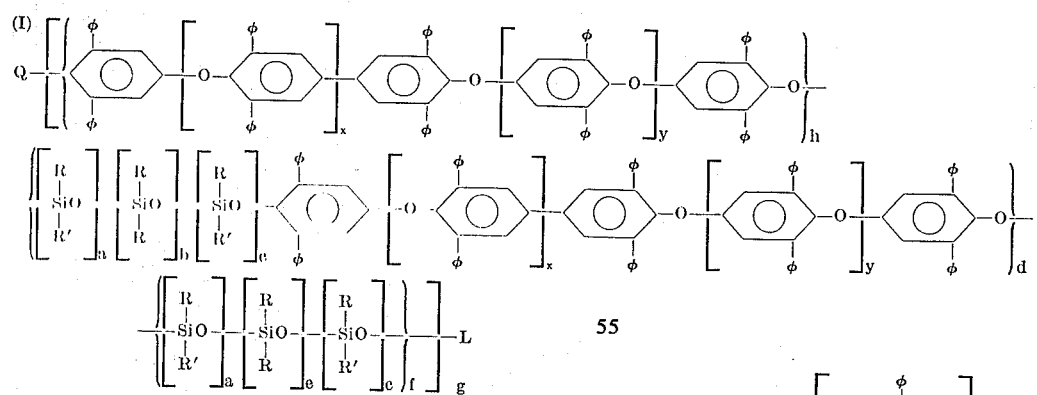

and
(II)
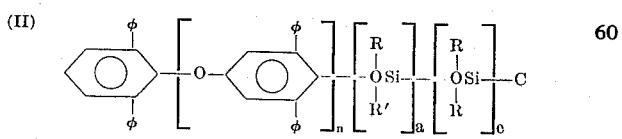

where Q is chosen from the group consisting of a single bond, OH,

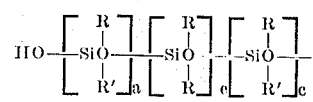

and

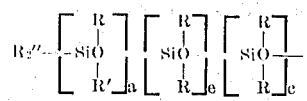

L is chosen from the group consisting of a single bond,

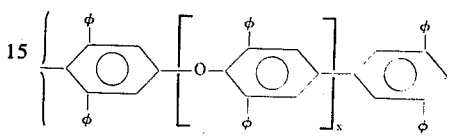

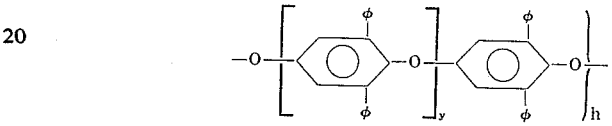

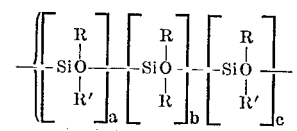

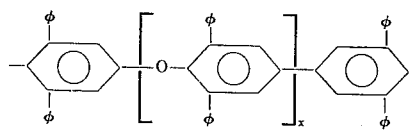

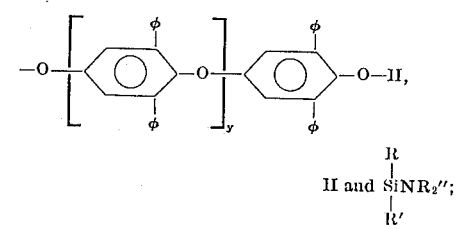

and C is chosen from the group consisting of OH

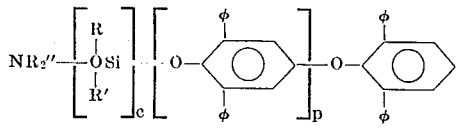

wherein each R' is independently selected from the class consisting of lower alkyl radicals having from one to six carbon atoms and cyano lower alkyl radicals and when R' is part of a siloxy unit which is not directly adjacent to a phenylene oxide unit it can also be a mononuclear or bi-nuclear aryl radical, R is selected from the same class as R', and in addition mononuclear and binuclear aryl radicals and in addition one of the radicals R and R' in each organic siloxy unit may be hydrogen, R'' is independently selected from the class consisting of hydrogen, lower alkyl radicals having from one to six carbon atoms and mononuclear and binuclear aryl radicals; $\phi$ is phenyl; each $a$ is from one to 10, each $b$ is from 0 to 16, each $c$ is from 0 to 10 when $b$ is 0 and from 1 to 10 when $b$ is greater than 0; $a + b + c$ is from 1 to 200 provided further that the value of subscript $a$ or $c$ for the siloxane block directly linked to

and for that block only is diminished by one from its value as a unit in a corresponding non-silyl amino-terminated polysiloxane, $d$ is 0 or more, $e$ is from 0 to 1,000, $a + c + e$ is from one to 1,000, $f$ is 0 or more, $g$ is one or more, $h$ is 0 or more, $n$ is at least 30, $p$ is at least 30, $x$ is from 0 to 20, and $y$ is from 0 to 20; with a further provision that when Q and L are single bonds, they are one and the same single bond which joins the ends of the molecule depicted by formula I to form a cyclic molecule; when Q is HO, then L is

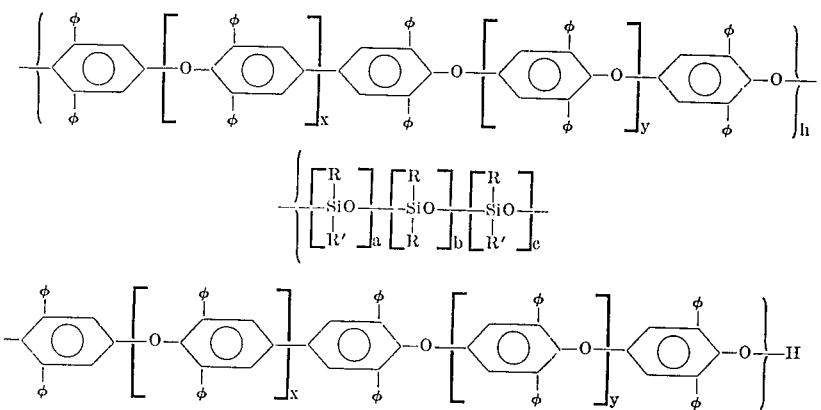

when Q is

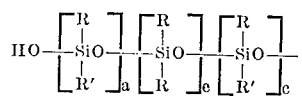

then L is H; and when Q is

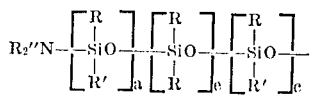

then L is

and the value of the subscript ($a$ or $c$) for the L-linked siloxane block only is diminished by 1 from its value as a unit in the corresponding non-silyl amino-terminated polysiloxane comprising reacting one or more diamino-terminated polysiloxanes selected from the group consisting of:

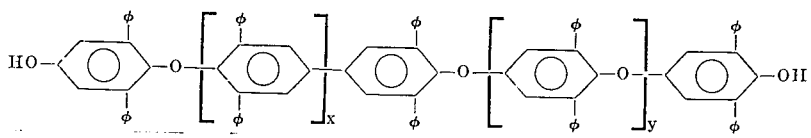

with one or more polyphenylene oxides selected from the class consisting of:

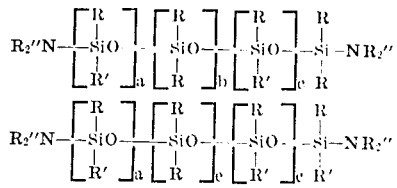

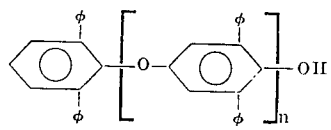

and hydroxy-terminated reaction products of one or more of the polyphenylene oxides with one or more of the diamino-terminated polysiloxanes.

12. The process of claim 11 wherein R is selected from the class consisting of methyl and phenyl and R' is methyl.

13. The process of claim 12 wherein each R is methyl.

14. The process of claim 11 wherein, following reaction of said polydiorganosiloxane and said polyphenylene oxide, the reaction product is further reacted with a polydiorganosiloxanediol.

15. The process of claim 11, wherein following reaction of said polydiorganosiloxane and said polyphenylene oxide, the reaction product is further reacted with water.

* * * * *